R. J. WELDON.
AUTOMATIC BRAKE-SETTING MECHANISM FOR PNEUMATIC BRAKES.
APPLICATION FILED APR. 18, 1914.
1,124,082.
Patented Jan. 5, 1915.
2 SHEETS—SHEET 1.
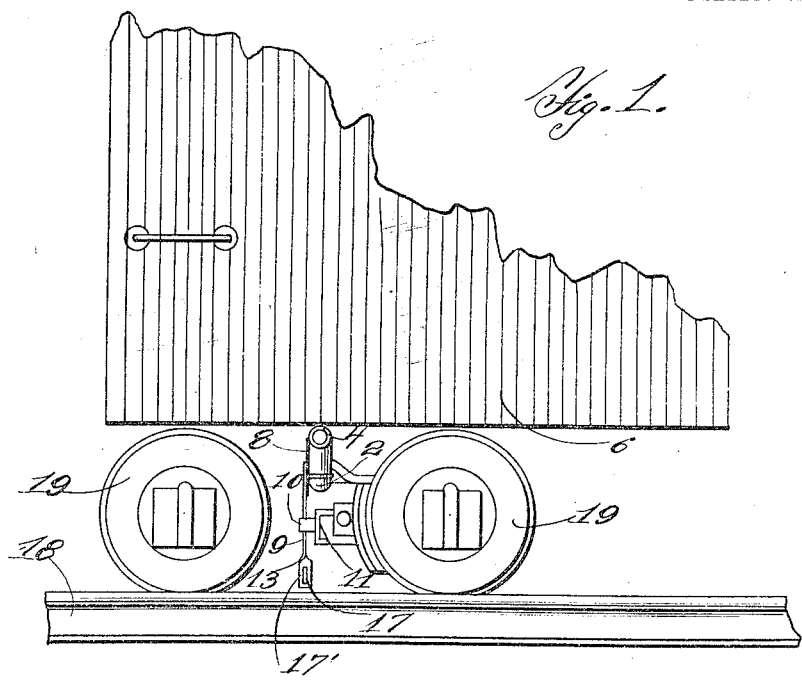
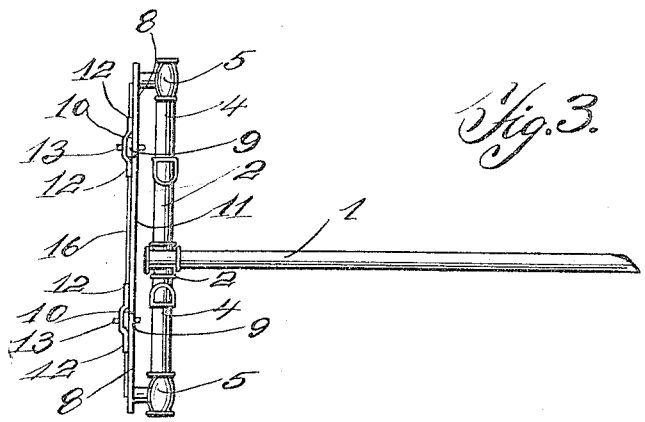

R. J. WELDON.
AUTOMATIC BRAKE SETTING MECHANISM FOR PNEUMATIC BRAKES.
APPLICATION FILED APR. 18, 1914.
1,124,082.
Patented Jan. 5, 1915.
2 SHEETS—SHEET 2.
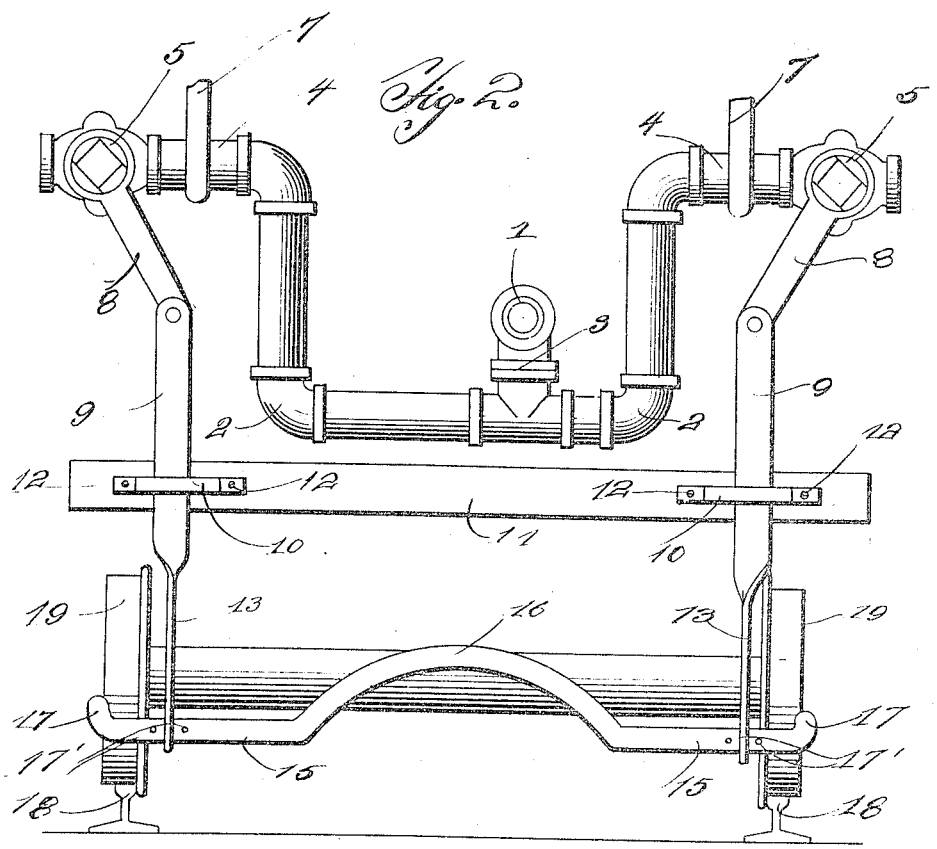
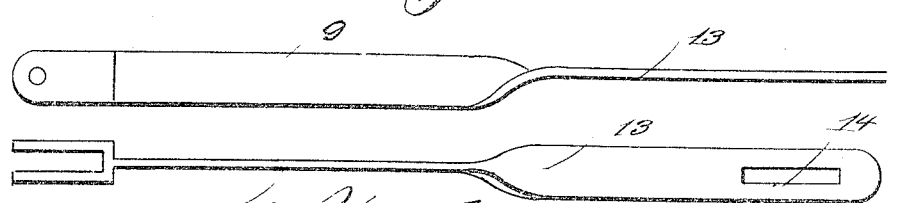

UNITED STATES PATENT OFFICE.

ROBERT J. WELDON, OF FORT WORTH, TEXAS.

AUTOMATIC BRAKE-SETTING MECHANISM FOR PNEUMATIC BRAKES.

1,124,082.     Specification of Letters Patent.     Patented Jan. 5, 1915.

Application filed April 18, 1914. Serial No. 832,908.

*To all whom it may concern:*

Be it known that I, ROBERT J. WELDON, a citizen of the United States, residing at Fort Worth, in the county of Tarrant and State of Texas, have invented certain new and useful Improvements in Automatic Brake-Setting Mechanism for Pneumatic Brakes; and I do hereby declare the following to be a full, clear, and exact description of the invention, such as will enable others skilled in the art to which it appertains to make and use the same.

This invention comprehends certain new and useful improvements in automatic brake setting mechanism for pneumatic brakes and has for its primary object to provide a device of this character which will be of extremely simple construction and operation as well as highly efficient in use, and which may be applied to cars and connected with the train air line to automatically set the air brakes upon derailment of the car.

Another object is to provide a device of this character which will be composed of a minimum number of parts, inexpensive to manufacture and apply and which will include a member adapted to ride above the rails and be forced upwardly by the same should one of the wheels leave its rail to operate the air brakes and thereby bring the entire train to a standstill, and prevent loss of property and lives.

A further object of this invention is to provide a device of this character including hollow members having communication with the air line and having normally closed valves therein adapted to be opened upon operation of the mechanism to cause automatic application of the brakes, in the event that any wheel of the train is derailed or any journal broken or burnt off.

This invention has for a still further object to generally improve and simplify the construction and operation of air brake attachments of this character and increase the efficiency thereof without increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a fragmentary side elevation of a car with my invention applied thereto, Fig. 2 is a rear elevational view thereof, Fig. 3 is a top plan view of the mechanism removed, Fig. 4 is a detail plan view of one of the vertical rods removed, Fig. 5 is a view similar to Fig. 4 and at right angles to the same.

Referring in detail to the drawings by numerals, oppositely directed pipe sections 2 which extend toward the opposite sides of the car, are connected with the train air line pipe 1, as shown at 3 and have upwardly offset portions 4 within which are positioned normally closed valves 5, the outer extremities of said pipe sections 2 being open, whereby the train air line pipe 1 may be relieved of the compressed air within the same when either of the valves 5 is moved to open position. The pipe sections 2 are secured to the bottom of the car body 6 by suitable hangers 7, preferably engaged around the upwardly offset portions 4 of said pipe sections 3. It will also be understood that the pipe sections 2 may be secured to the train air line pipe 1 at any suitable point, but are preferably positioned over the truck and in front of the center casting. I do not wish to limit myself, however, in this respect, as the position of the pipe sections 2 may be varied, as desired.

To the projecting stem of each valve 5, I have secured a lever arm 8, t the free or lower end of which is pivotally connected the upper end of a vertical bar 9, which extends through a guide strap 10 which has its opposite end offset from its main portion and secured to the supporting member 11 of the truck, as shown at 12. After being passed through the guide straps 10, the bars 9 are twisted, to place the lower ends 13 thereof at right angles to the main portions of said bars 9 and to strengthen said bars. The lower end 13 of each bar 9 is provided with an elongated slot 14, through which are engaged the opposite ends 15 of the horizontal actuating bar 16 which has its opposite extremities curved upwardly, as shown at 17, and its central portions bowed upwardly, as clearly shown in Fig. 2. The horizontal actuating bar 16 is limited in longitudinal movement by means of the stop pins 17' engaged therethrough upon opposite sides of the depending ends 13 of said vertical bars 9.

The horizontal actuating bar 16 is of such length that the portions outwardly of the depending ends or lower ends 13 of the bars 9, rest a spaced distance above the rails 18 upon which the wheels 19 of the car are engaged and the slots 14 are of such length as to allow a limited movement therein of the horizontal actuating bar 16 caused by rocking of the car truck, without causing any movement of the bars 9 and the valves 5.

Should either wheel 19 leave its rails 18 and thereby throw the horizontal actuating bar 16 into engagement with said rails 18, or should the horizontal actuating bar 16 be forced upwardly by engagement with the rail 18 or by an engagement with an obstruction upon the track, the vertical bars 9 will be forced upwardly and thereby cause the arms 8 to swing in the proper direction to open one or both of the valves 5 and thereby allow air from the train air line pipe to escape and cause automatic application of the brakes. It will be understood that owing to the size and position of the guide straps 10, the vertical bar 9 will be allowed to move a sufficient distance in either direction during swinging movement of the arms 8. It will be evident that the lever arms 8 as well as the actuating bar 16 may be readily returned to normal position after each operation of the device and it will be understood that the device will only operate in case of an emergency and will be positive and automatic and thereby eliminate danger of great loss of property and possibly lives, as it will be readily understood that this device may be employed upon passenger cars or freight cars and upon any form of rolling stock provided with a train air line pipe and air brakes connected with said train or air line pipes.

While I have shown and described the preferred embodiment of my invention, it will be understood that minor changes in construction, combination and arrangement of parts may be made without departing from the spirit and scope of the invention as claimed.

What is claimed is:—

1. A device of the class described comprising the combination with a train air line pipe; of a pipe projecting from said train air line pipe, a valve within the last mentioned pipe, connected lever arms and bars, said lever arms being connected with the valves, means for guiding the bars, and an actuating member suspended in the bars for operating said lever arms to move the valve to open position.

2. A device of the class described comprising the combination with a train air line pipe; of an auxiliary pipe connected with said train air line pipe, a valve within said auxiliary pipe, a lever arm connected with said valve, a second bar connected with the lever arm, guide means for the bar, said bar having one end turned at right angles to the opposite end thereof, the turned end of said bar being provided with a longitudinal slot, said valve being normally in closed position, and an actuating member engaged through said slot for operating the connected lever arms to move the valves to open position.

3. A device of the class described comprising the combination with a train air line pipe; of auxiliary pipes connected with said train air line pipe and directed in opposite directions, valves within said auxiliary pipes, bars connected with said valves, said valves being normally closed, certain of said bars being provided with elongated openings, an actuating bar having its opposite ends engaged through the elongated openings, means for limiting longitudinal movement of said actuating bar, and means for guiding said bars.

4. A device of the class described comprising the combination with a train air line pipe connected with air brakes; of auxiliary pipes connected with said train air line pipe, valves carried by said auxiliary pipes, means for supporting said auxiliary pipes, said valves being normally closed, bars connected with said valves, an actuating member suspended in said bars and forced in one direction to cause movement of said bars to open the valves and thereby relieve the train air line pipe of its compressed air and permit application of the brakes, and guide means for said bars.

In testimony whereof I affix my signature in presence of two witnesses.

ROBERT J. WELDON.

Witnesses:
  A. N. ELLISON,
  R. B. RIDGWAY.